(12) United States Patent
Kahlman (10) Patent No.: US 11,988,003 B2
(45) Date of Patent: May 21, 2024

(54) POST

(71) Applicant: Sture Kahlman, Fjällbacka (SE)

(72) Inventor: Sture Kahlman, Fjällbacka (SE)

( * ) Notice: Subject to any disclaimer, the term of this patent is extended or adjusted under 35 U.S.C. 154(b) by 242 days.

(21) Appl. No.: 17/423,777

(22) PCT Filed: Jan. 13, 2020

(86) PCT No.: PCT/EP2020/050709
§ 371 (c)(1),
(2) Date: Jul. 16, 2021

(87) PCT Pub. No.: WO2020/148233
PCT Pub. Date: Jul. 23, 2020

(65) Prior Publication Data
US 2022/0090404 A1    Mar. 24, 2022

(30) Foreign Application Priority Data

Jan. 18, 2019    (SE) .................................... 1950062-8

(51) Int. Cl.
*E04H 12/02* (2006.01)
*B32B 1/08* (2006.01)
(Continued)

(52) U.S. Cl.
CPC .............. *E04H 12/02* (2013.01); *B32B 1/08* (2013.01); *B32B 3/266* (2013.01); *B32B 27/12* (2013.01);
(Continued)

(58) Field of Classification Search
CPC .... B29C 45/14631; B29C 2045/14327; B32B 17/04; E04C 3/29
(Continued)

(56) References Cited

U.S. PATENT DOCUMENTS 3,349,537 A * 10/1967 Hopfeld .................... E04C 3/29
52/309.14
3,487,518 A * 1/1970 Hopfeld .................... E04C 3/29
273/DIG. 7
(Continued)

FOREIGN PATENT DOCUMENTS

CA          2012973 A1   9/1991
CN       106337430 A   1/2017
(Continued)

OTHER PUBLICATIONS

International Search Report and Written Opinion for Application No. PCT/EP2020/050709, dated Apr. 20, 2020.
(Continued)

*Primary Examiner* — Brent W Herring
(74) *Attorney, Agent, or Firm* — MARSHALL, GERSTEIN & BORUN LLP (57) ABSTRACT

A post comprises a first end and a second end. The first end comprises a connection arrangement for fixing the post to the ground or the bottom under water and wherein the post is tubular. A first layer of the post is made of a plastic and a second layer is made of a composite material having a higher e-modulus than that of the plastic and wherein the first layer comprises at least one hole which the composite material of the second layer extends at least partly into.

9 Claims, 6 Drawing Sheets

(51) Int. Cl.
*B32B 3/26* (2006.01)
*B32B 27/12* (2006.01)
*B32B 27/30* (2006.01)
*E04H 12/22* (2006.01)

(52) U.S. Cl.
CPC ....... *B32B 27/304* (2013.01); *E04H 12/2223* (2013.01); *B32B 2250/02* (2013.01); *B32B 2262/101* (2013.01); *B32B 2597/00* (2013.01)

(58) Field of Classification Search
USPC .................... 52/831, 843, 847; 264/273
See application file for complete search history.

(56) References Cited

U.S. PATENT DOCUMENTS

| | | | |
|---|---|---|---|
| 3,820,906 A | 6/1974 | Katt | |
| 4,435,930 A | 3/1984 | Plym | |
| 4,939,037 A * | 7/1990 | Freeman | G09F 7/18 |
| | | | 428/34.4 |
| 5,238,716 A * | 8/1993 | Adachi | B66F 11/044 |
| | | | 428/36.1 |
| 6,434,906 B1 | 8/2002 | Jernstrom | |
| 7,721,496 B2 * | 5/2010 | Carlson | E04B 5/12 |
| | | | 52/843 |
| 8,273,427 B1 * | 9/2012 | Steinhour | B32B 3/08 |
| | | | 428/36.1 |
| 2004/0261330 A1 * | 12/2004 | Oliver | E02D 5/801 |
| | | | 52/156 |
| 2009/0094929 A1 * | 4/2009 | Carlson | B32B 3/30 |
| | | | 52/173.3 |
| 2010/0101130 A1 * | 4/2010 | Boyce | B29C 45/14631 |
| | | | 40/607.01 |
| 2016/0311467 A1 * | 10/2016 | Johnston | B60R 19/18 |
| 2022/0268023 A1 * | 8/2022 | Cotter | C03C 25/26 |

FOREIGN PATENT DOCUMENTS

| | | |
|---|---|---|
| CN | 206667887 U | 11/2017 |
| EP | 244851 B1 | 11/1987 |
| GB | 2448362 A | 10/2008 |
| GB | 2448363 A | 10/2008 |
| WO | WO-2013109186 A1 | 7/2013 |

OTHER PUBLICATIONS

Communication pursuant to Article 94(3) EPC in corresponding Application No. EP 20700593.5, dated Mar. 22, 2024.

* cited by examiner

POST

TECHNICAL FIELD

The present invention relates to a post comprising a first end and a second end, wherein the first end comprises a connection arrangement for fixing the post to the ground or the bottom under water and wherein the post is tubular.

BACKGROUND

Posts for lamps and signs are generally made from steel with specific characteristics in order to make them safe from a vehicle point of view when being hit. Since they are made of steel they are of course quite heavy. When installing them or repairing them, a truck or similar equipped with a crane is necessary. In some cases it might even be necessary to close off an entire road during this kind of work. The weight can further pose a problem when trying to get the posts completely vertically aligned. Burying the foundations for these posts is a time consuming process as well as prefabricating them. Also, backfilling and packing of the backfill is also required.

Further, posts that are being exposed to dogs peeing on them are subject to accelerated corrosion since urine contains ammonia, salt, and nitrogen. One way to overcome this problem is to use cuffs/sockets and placing them at the feet of the posts. These cuffs/sockets are generally made from sheets of steel with a layer of thermoplastic. Even though the problem can be solved, this solution also adds to the weight and cost of the post.

Known posts sometimes vibrates or shakes which affects the lifetime of the luminaire and of course the stability of the light itself. Flickering light as a result of these vibrations could, for instance, scare horses at races.

SUMMARY

The present invention aims to overcome or at least to some extent remedy the above mentioned problems in an alternative way using a post according to the appended claims. The word post is used throughout the description but this word could for most cases be replaced with pile.

According to a first aspect of the present disclosure a post comprises a first end and a second end, wherein the first end comprises a connection arrangement for fixing the post to the ground or the bottom under water and wherein the post is tubular. A first layer of the post is made of a plastic and a second layer is made of a composite material having a higher e-modulus than that of the plastic and wherein the first layer comprises at least one hole which the composite material of the second layer extends at least partly into.

The composite material of the second layer extending at least partly into the hole of the first layer helps the first layer and the second layer to stay in the same position relative one another. Obviously, it is possible to have more than one hole in the first layer.

The difference in e-modulus works such that when it is windy the different materials of the post have different oscillation frequencies that counteract to make the post stable. Further characteristics of these materials are that a post made from these materials is essentially lighter than a traditional post made of steel. When performing tests of hitting traditional steel posts and posts according to the present invention a traditional post pivots about 3 to 4 times longer than a post according to the present invention.

By tubular is meant that the inner layer is tube shaped, i.e. like an elongated cylinder. For aesthetic reasons one might consider for instance a rectangle cross section of the post but the circular cross section has advantages from a strength point of view not to mention efficiency in production.

Preferably the plastic is PVC and the composite material is fiberglass. One way to do this is to use a PVC tube and to put a coat of fiberglass on the tube. One type of fiberglass coating could be fiberglass in the form of roving or a mix of fiberglass roving and fiberglass. A further alternative is a reinforced plastic with synthetic fibers.

An advantage of having posts made of non-conductive materials is that electrical creepage is avoided. For instance, this could be important if the posts are used for solar panels where a lot of electricity is produced, i.e. electrical creepage is an issue at solar plants using traditional posts made of conductive materials such as steel.

To further stabilize the post when it is windy a part adjacent the second end of the post could be provided grooves.

The grooves are preferably provided spirally around said part.

According to a further aspect of the present invention the composite of the second layer extends entirely through the hole of the first layer. A variant of this is to have the composite to extend not just entirely through the hole but also that the composite is applied such that it goes through the hole and onto the opposite side of the first layer. In a cross section of a hole with the composite extending through the hole, from one side of the first layer the appearance of the composite is that of a rivet, i.e. with a rivet head on one side of the first layer. This increases the strength of the connection between the first and the second layer.

The rivet like plugs break to some extent the axial power flow and divert it in a radial direction. Thus, the axial power between the layers of different e-modulus is reduced and therefore the life time of the seam, i.e. the connection between the layers, is increased.

In yet another aspect of the present invention the second end of the post comprises a connection arrangement for connecting a lamp. For easy replacement of the entire lamp housing, preferably the electric wiring is of the plug and socket type. Also, the connection between the lamp housing and the post is preferably of the type where no specific tools are necessary, e.g. a bayonet connection.

According to yet another aspect of the present invention the first layer is the inner layer and the second layer is the outer layer.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
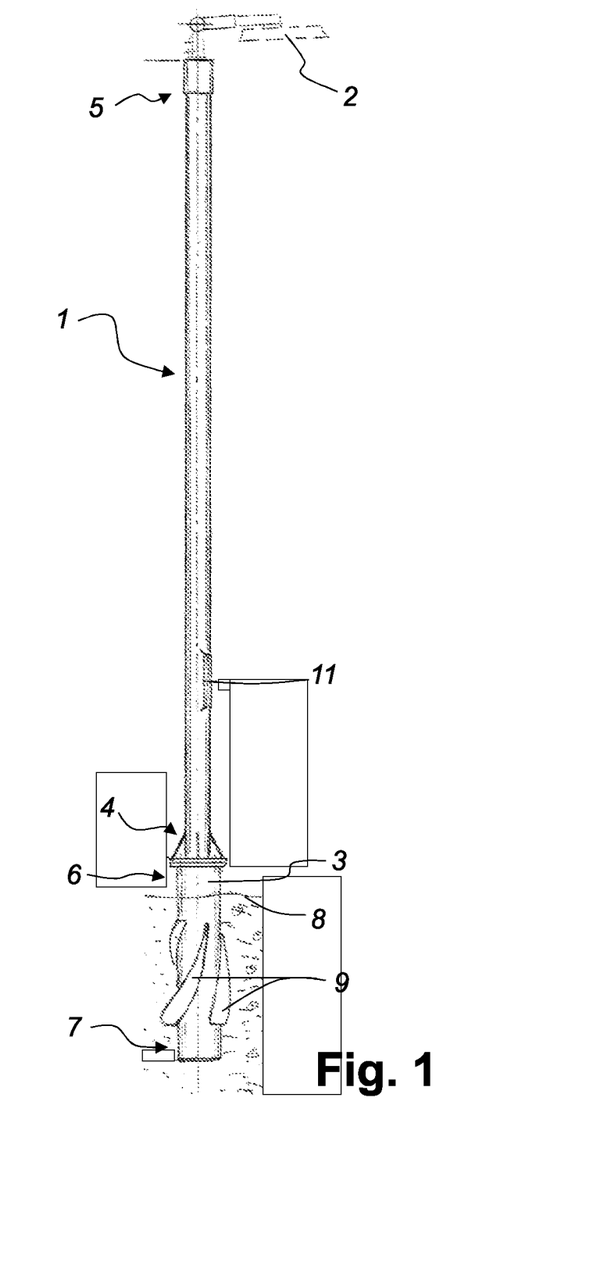
FIG. 1 is a side view of a post according to the present invention.

FIG. 1 shows an outdoor post 1 with a lamp 2 comprising a foundation 3, a connection part at a first end 4 for connecting said post to the foundation 3 allowing for alignment and rotation and a second end 5 holding the lamp 2. The foundation 3 further has a first end 6 with a connection part for connecting with said post 1 and a second end 7 that upon use is located below ground 8. The post 1 is tubular and made from inner PVC tube and an outer layer of fiberglass or plastic with reinforcement, the outer layer having an e-modulus that is greater than that of the PVC tube.

The weight of a post 1 according to the present invention is just a fraction of that of a traditional one made from steel.

Also the foundation 3 is tubular such that it can easily be pushed into the ground 8. The foundation 3 is further equipped with three threads 9 that further facilitates pushing the foundation 3 into the ground 8 maintaining the direction. When pushed into the ground 8, the foundation 3 will screw itself into the ground 8. This is possible due to the steep angle of the thread; the lead of the thread 9 should be greater than the diameter of the foundation 3 for this to work properly. The foundation 3 is first arranged in the ground 8 before attaching the post 1. The material that is pressed into the post/tube will be in tight fit with the inside of the post/tube which reinforces the post/tube while the thread stabilizes the post/tube. In case the axial load is large it might be appropriate to have a lower thread pitch such that the foundation 3 does not screw itself into the ground. In such a case the foundation 3 would have to screwed/rotated into the ground.

Further, a hatch 11 is shown that can be opened for access to the electric wiring or other components in a post when it is used as a lamp.

Figure 2:
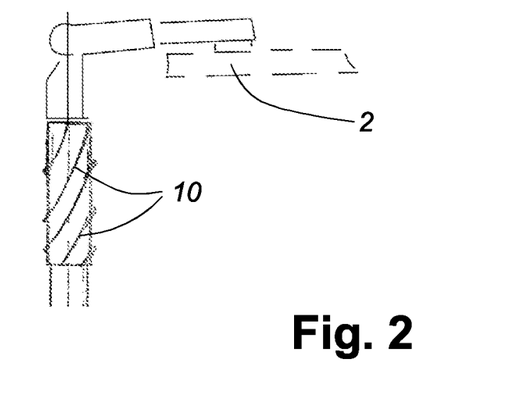
FIG. 2 is a side view of a top part of the post according to the present invention.

Turning now to FIG. 2 which shows the upper part of the post with the lamp 2, the upper part is here provided with grooves 10 which are spirally arranged. The grooves help create a more stable turbulence when subject to strong winds and thus further decrease the risk for the post to oscillate. The construction of the post itself with the two materials having different e-modulus decreases the risk of the post oscillating, but the part with grooves could be added when extreme conditions are more common and/or the post is relatively long.

Figure 3:
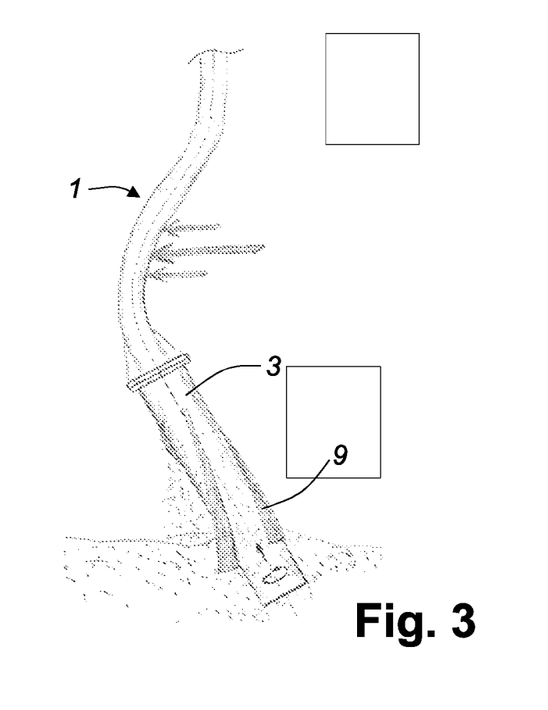
FIG. 3 is a side view of a lower part of the post with the foundation when being hit by a vehicle.

As when pushing the foundation 3 into the ground and it screws itself downwards, when hit as indicated in FIG. 3, the threads 9 dampens the speed of the foundation being pulled out of the ground. The un-screwing of the post with the foundation 3 is further dampened since the entire post will also have to rotate. In FIG. 3, a post 1 being hit by a vehicle as indicated by the arrows will thus present some resilience.

Figure 4:
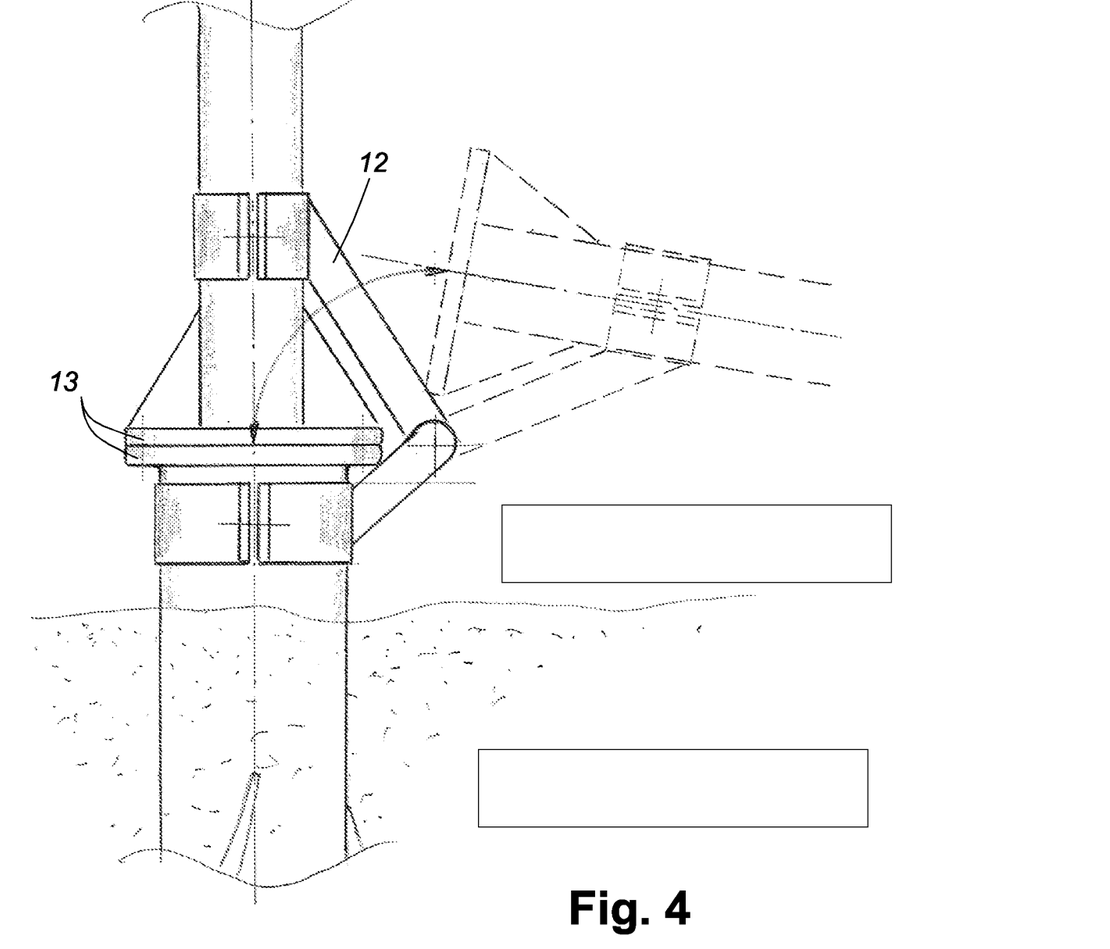
FIG. 4 shows a device for use when mounting or servicing a post according to the present invention.

A standard post for a lamp with a length of 5 m will weigh about 20 kg including the lamp. Upon servicing or installation, the technician can easily do it solo. FIG. 4 shows a device 12 having two parts that are linked together. Upon use, one part is attached to the foundation and the other part is attached to the post, the foundation and post here having corresponding flanges 13. The device 12 will help controlling the raising of the post once the foundation is driven into the ground and all the electric wiring is connected.

The device 12 will further assist when adjusting the angle of the post in case the foundation is for instance not exactly vertically arranged in the ground. Typically, an electrician can work alone when installing a lamp by joining wires that project from the ground, through the foundation and the wiring coming from the lamp end of the post and projects through to the other end of the post. Also, it is possible to make a complete installation of appliances like for instance, solar cells, battery etc. before the post is erected.

Figure 5:
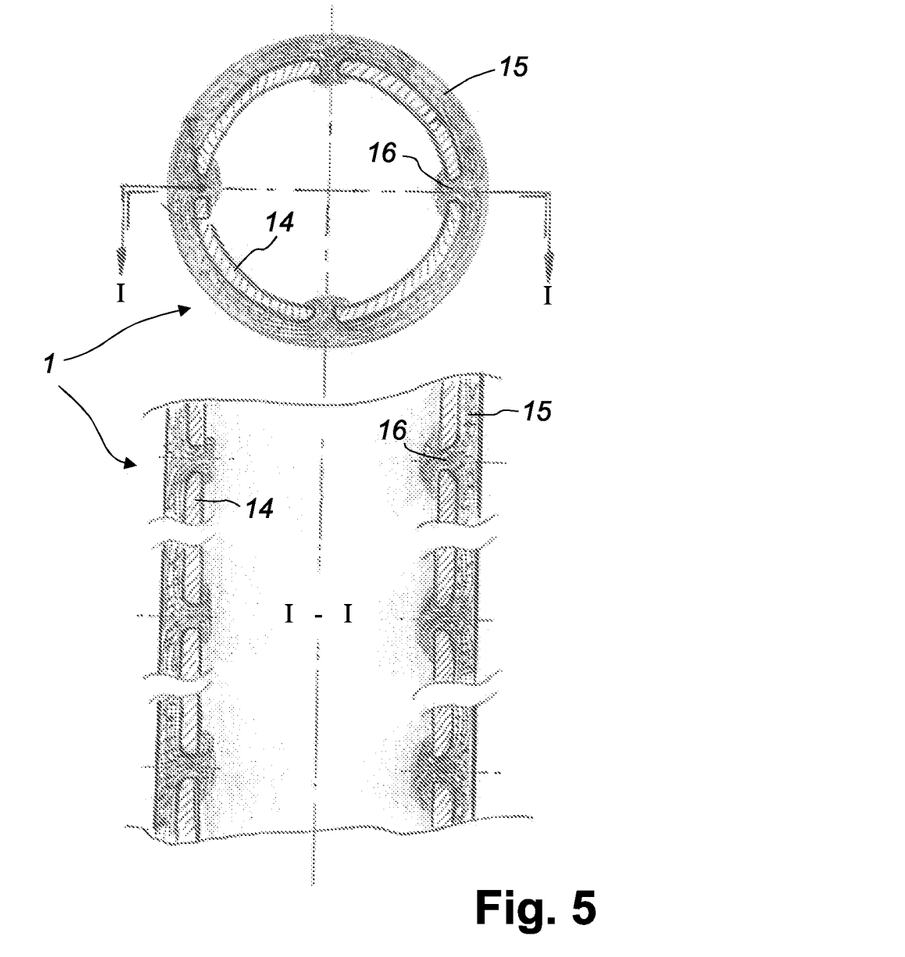
FIG. 5 shows a cross section of a post according to the present invention.

Turning to FIG. 5, an example embodiment of the post 1 is shown in cross section, both across the post (the above drawing) and along the post (the lower drawing). In this embodiment, the inner layer 14 of the post 1 has four holes 16 evenly distributed in the circumference and further sets of four holes 16 repeatedly along the post 1. As can be seen in the figure, the shape of the composite from the inside of the outer layer 15 through the holes 16, reminds of a rivet.

The rivet like plugs break to some extent the axial power flow and divert it in a radial direction. Thus, the axial power between the layers of different e-modulus is reduced and therefore the life time of the seam, i.e. the connection between the layers, is increased.

Figure 6:
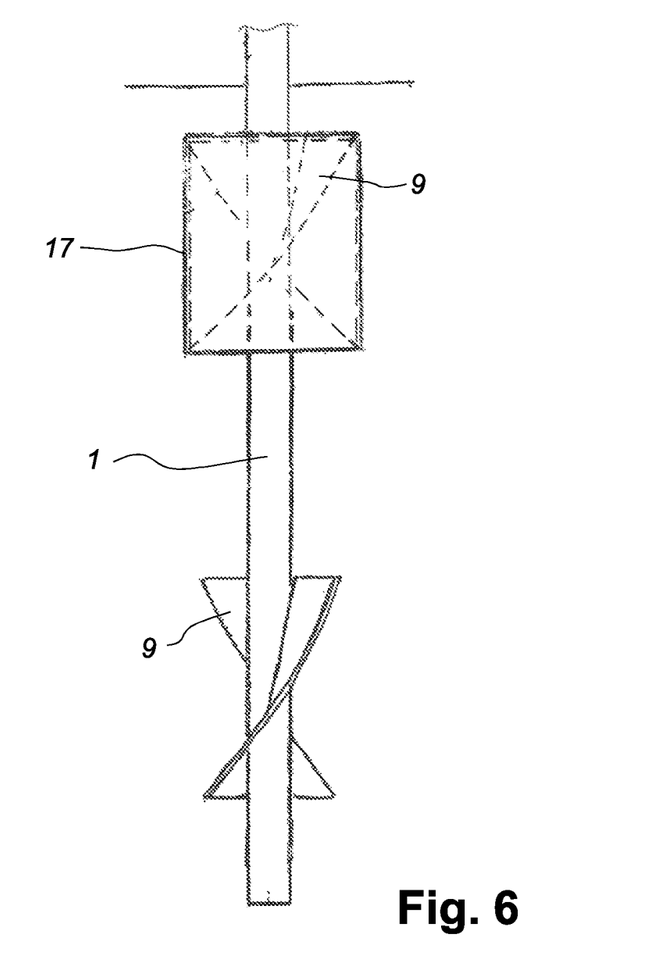
FIG. 6 shows an alternative embodiment of a post according to the present invention.

In FIG. 6, an embodiment of the post 1 is shown where it is used as a pile in for instance mud, both under water or where the ground itself is muddy-like. The threads 9 have a relatively high pitch such that when the pile is pushed downwards, the pile 1 rotates clockwise (seen from above). To make the pile/post 1 stable in the transverse direction a cylinder shaped part 17 is attached to the outer edges of another set of threads 9, this additional set of threads 9 will of course also help drive the post 1 into the ground. The soil that eventually will be inside the cylinder shaped part 17 will have the same function as that of a traditional concrete foundation but without the drawbacks of the traditional concrete foundation, the drawbacks including displacement of surrounding soil/sand/mud and handling the weight of the foundation. Also, the threads 9 in this example are attached directly to the post 1.

Figure 7:
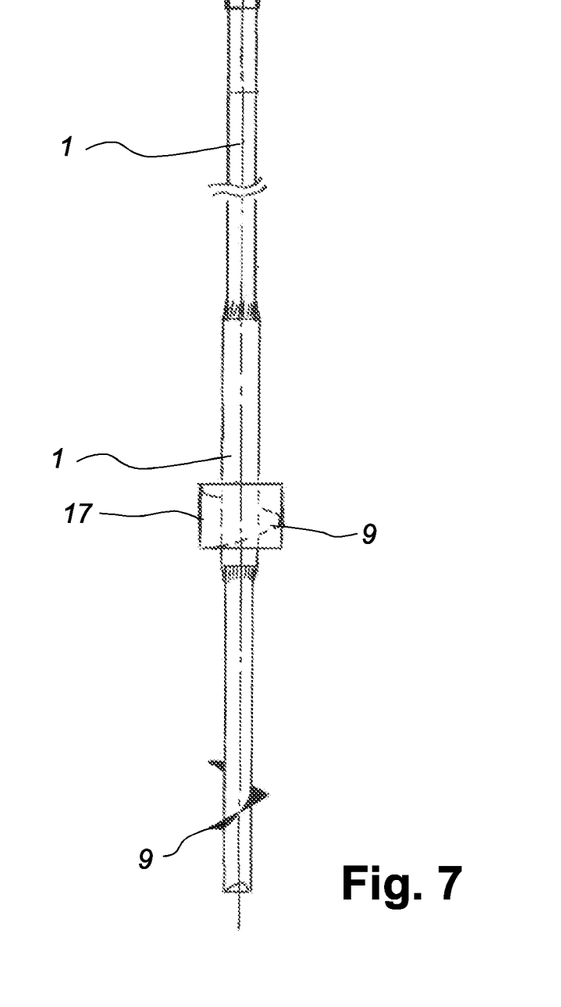
FIG. 7 shows yet an alternative embodiment of a post according to the present invention.

If the axial force is high on the post, the thread pitch should be lower than that shown in FIG. 6. In FIG. 7, an embodiment of the post 1 is shown where it is used as a pile in for instance mud, both under water or where the ground itself is muddy-like. The threads 9 are used to force the pile into the ground when the post 1 is rotated clockwise (seen from above). Because of the lower pitch of the threads as compared to the pitch of the threads shown in FIG. 6, the pile does not automatically rotate if an axial force is applied. To make the pile/post 1 stable in the transverse direction a cylinder shaped part 17 is attached to the outer edges of another set of threads 9, this additional set of threads 9 will of course also help drive the post 1 into the ground. The soil that eventually will be inside the cylinder shaped part 17 will have the same function as that of a traditional concrete foundation but without the drawbacks of the traditional concrete foundation, the drawbacks including displacement of surrounding soil/sand/mud and handling the weight of the foundation. Also, the threads 9 in this example are attached directly to the post 1.

It is to be understood that the present invention is not limited to the embodiments described above and illustrated in the drawings; rather, the skilled person will recognize that many changes and modifications may be made within the scope of the appended claims.

For example, the number of holes in the first/inner layer can be varied. The intended use of the post is a factor and the dimension of the post, both the diameter and the length as well as the size of the holes. Further, the inner layer could be made from steel and an outer plastic layer having a lower e-modulus could be useful, especially for protecting a "standard" post and reducing vibrations as well.

The invention claimed is:

1. A post comprising a first end and a second end, wherein the first end comprises a connection arrangement for fixing the post to the ground or the bottom under water and wherein the post is tubular,
characterized in
that the post comprises a first layer made of a plastic and a second layer made of a composite material having a higher e-modulus than that of the plastic and wherein the first layer comprises at least one hole which the composite material of the second layer extends at least partly into and wherein the first layer is an inner layer and the second layer is an outer layer.

2. The post according to claim 1, wherein the plastic is PVC and the material with a higher e-modulus is a composite material reinforced with synthetic fibers.

3. The post according to claim 2, wherein the reinforcement is in the form of fiberglass.

4. The post according to claim 2, wherein the composite material is a mix of plastic and fiberglass.

5. The post according to claim 2, wherein the composite material of the second layer extends entirely through the hole.

6. The post according to claim 1, wherein the connection arrangement comprises screw threads arranged on the outside of the post.

7. The post according to claim 1, wherein a part adjacent the second end of the post is provided with grooves on the outside of the post.

8. The post according to claim 7, wherein the grooves are arranged spirally on said part.

9. The post according to claim 1, wherein the second end of the post comprises a connection arrangement for connecting a lamp.

* * * * *